(12) United States Patent
Hersche et al.

(10) Patent No.: US 8,249,100 B2
(45) Date of Patent: Aug. 21, 2012

(54) METHOD AND ARRANGEMENT FOR PROVIDING DUPLEX COMMUNICATIONS BETWEEN A CLIENT APPLICATION AND A SERVICE USING AN HTTP REQUEST/REPLY CHANNEL

(75) Inventors: Andreas Hersche, Island Lake, IL (US); Dario Incorvaia, Milan (IT)

(73) Assignee: Siemens Industry, Inc., Alpharetta, GA (US)

( * ) Notice: Subject to any disclaimer, the term of this patent is extended or adjusted under 35 U.S.C. 154(b) by 313 days.

(21) Appl. No.: 12/566,661

(22) Filed: Sep. 24, 2009

(65) Prior Publication Data

US 2010/0074150 A1  Mar. 25, 2010

Related U.S. Application Data

(60) Provisional application No. 61/194,219, filed on Sep. 25, 2008.

(51) Int. Cl.
*H04J 3/16* (2006.01)
*G06F 15/16* (2006.01)

(52) U.S. Cl. .............. 370/466; 709/203; 709/216

(58) Field of Classification Search .......... 370/276, 370/400, 401, 464–467; 709/201–203, 213, 709/216, 230, 232
See application file for complete search history.

(56) References Cited

U.S. PATENT DOCUMENTS

| 7,394,761 | B2 * | 7/2008 | Foster et al. ............... 370/227 |
| 7,987,003 | B2 * | 7/2011 | Hoffberg et al. ........... 725/119 |
| 2004/0167983 | A1 | 8/2004 | Friedman |
| 2007/0136445 | A1 * | 6/2007 | Sweatt et al. ............... 709/219 |
| 2007/0185975 | A1 * | 8/2007 | Cunningham et al. ...... 709/217 |
| 2009/0265763 | A1 * | 10/2009 | Davies et al. .............. 709/206 |

OTHER PUBLICATIONS

Tschalar. Sep. 16, 2006 Retrieved from the Internet: URL: http://www.innovation.ch/java/HTTPClient/fullduplex.html>, retrieved on Nov. 23, 2009 (pp. 1-3); Magazine.
Young. Sep. 14, 2008. Retrieved from the Internet: URL: http://weblogs.java.net/blog/rexyoung/archive/2008/09/turn_a_http_con_1.html> the whole document. retrieved on Nov. 23, 2009; Magazine.
Young. Sep. 10, 2008. Retrieved from the Internet: URL: http://weblogs.java.net/blog/rexyoung/archive/2008/09/turn_a_http_con.html> the whole document. retrieved on Nov. 23, 2009; Magazine.
Zyp. May 13, 2008. Retrieved from the Internet. URL: http://cometdaily.com/2008/05/13/http-channels-2/> the whole document. Retrieved on Nov. 23, 2009; Magazine.
Sun, et al. Published by Networks, 2004 (ICON 2004). Proceedings, 12th IEEE International Conference on Singapore, Nov. 16-19, 2004 (pp. 258-262); Magazine.

* cited by examiner

*Primary Examiner* — Kerri Rose (57) ABSTRACT

A method includes providing at a first computer an application generating service requests at a duplex channel interface, at least a first service request requesting multiple subsequent data responses from a service located on a second computer. The method also includes employing a first process to convert the first service request into a first http request and transmitting the first http request over a network. The method further includes employing the first process to generate a second http request in the form of a polling request. A context reply to the second http request containing data responsive to the first service request is received. The method aldsod includes providing the data response to the first service request to the duplex channel interface.

28 Claims, 9 Drawing Sheets

METHOD AND ARRANGEMENT FOR PROVIDING DUPLEX COMMUNICATIONS BETWEEN A CLIENT APPLICATION AND A SERVICE USING AN HTTP REQUEST/REPLY CHANNEL

This application claims the benefit of U.S. Provisional Application Ser. No. 61/194,219, filed Sep. 25, 2008, which is incorporated herein by reference.

FIELD OF THE INVENTION

This invention relates to communications between computers, and in particular, to communication between an application on a first computer and a service on a second computer.

BACKGROUND OF THE INVENTION

It is known in the art for a software application to employ services and/or methods to carry out functions useful to the application. In many cases, the services or methods reside on the same computer as the application, and are therefore readily accessible. However, it is known to make service methods resident on a server available to client applications.

In one example, an application on a first computer may employ a server method in order to subscribe to updates to a certain variable that is maintained by other software on a server computer. Such an application may be used in a building control system, for example, a heating, ventilation and air conditioning ("HVAC") system. In one example, a client computer can subscribe to alarm information that is maintained on a server computer. In HVAC and other building control systems, alarms can be generated when one or more devices malfunctions, or if the system cannot heat or cool portions of the building as requested.

Further to this example, a user at a computer station may desire to obtain notification of any new alarms from a server computer that maintains alarms in the system. In such a case, the client application invokes a service on the server computer that provides alarm status updates to the first (client) computer as they occur.

To provide ongoing updates, the client/server relationship must generally be a so-called "full trust" relationship. In other words, communications between the server and the client must occur without firewall protection. Suitable "full trust" environments can be configured in a local area network ("LAN") or virtual private network ("VPN"), among other ways. Forms of "partial trust" may also be used. In such environments, the service methods or processes on the server computer are extensions of the available library of functions available to the client, and can provide rich levels of service.

Thus, for example, in a full trust environment, service methods and processes that provide data updates and other similar objects employ full duplex communications. In duplex communications, the service object may communicate updates to the client application as they occur.

By contrast, some connections, for example, World Wide Web connections, between a client computer and a server computer are subject to firewall protections. More specifically, communication over the web using an ordinary web browser occur through a firewall, and have limited functional connectivity. Such communication is carried out using the hypertext transfer protocol ("http"). In general, a web client formulates an http request, and the web browser provides a context reply. The web client awaits the reply. However, once the reply is received, the web client does not accept additional replies to the initial request. Accordingly, attempting to subscribe to a service method or process that provides multiple subsequent updates cannot be readily accomplished using http requests in firewalled web environment.

As a consequence, there are limitations to connections via the web that are not present in LAN, VPN and other non-firewalled environments.

However, it is still possible to use web connections to request a server for multiple updates to a variable or file using polling techniques. In particular, to provide the ability to obtain updates in an Internet (firewall) environmental, it is known to provide the web client with a polling function that automatically renews requests for values from a server. For example, if the web client desires updates to an alarm status, the web client periodically reissues requests for any new alarm status. This practice is known as polling. If the web client issues a polling request every minute, then the alarm status is updated in the web client every minute.

The downside to the polling practice of the prior art is that it has inefficiencies. In particular, if there are no updates to the data of interest for long periods of time, then the web client issues many polling requests that return no data of interest. This unnecessarily employs resources related to issuing an http request, as well as generating the context reply in the server. However, using a low frequency of polling requests can result in delayed updates, and thus reduce the responsiveness of the application.

Accordingly, there is a need to improve efficiency in communications between a web client and a web service, particularly when the web client subscribes to receive periodic update of values from the web service to be initiated by the web service.

SUMMARY OF THE INVENTION

At least some embodiments of the present invention address the above need by providing a method and arrangement for providing duplex communications between a client application and a service using an http request/reply channel. In some embodiments of the arrangement, a client application may provide multiple service requests to a server in duplex mode. A software function coordinates the transmission of such service requests as http requests, and coordinates the return messages received as http replies. Each http reply may contain data unrelated to the corresponding http request. Thus, updates may be received in response to other http requests, providing for a timely and efficient updating tool. Polling may be used occasionally if necessary.

A first embodiment of the invention is a method that includes providing at a first computer an application generating service requests at a duplex channel interface, at least a first service request requesting multiple subsequent data responses from a service located on a second computer. The method also includes employing a first process to convert the first service request into a first http request, and transmitting the first http request over a network. The method further includes receiving a context reply to the http request, and employing the first process to generate a second http request unrelated to the first service request. The method also includes receiving a context reply to the second http request containing data responsive to the first service request. The data response to the first service request is provided to the duplex channel interface.

The above described features and advantages, as well as others, will become readily apparent to those of ordinary skill in the art by reference to the following detailed description and accompanying drawings.

DETAILED DESCRIPTION

Figure 1:
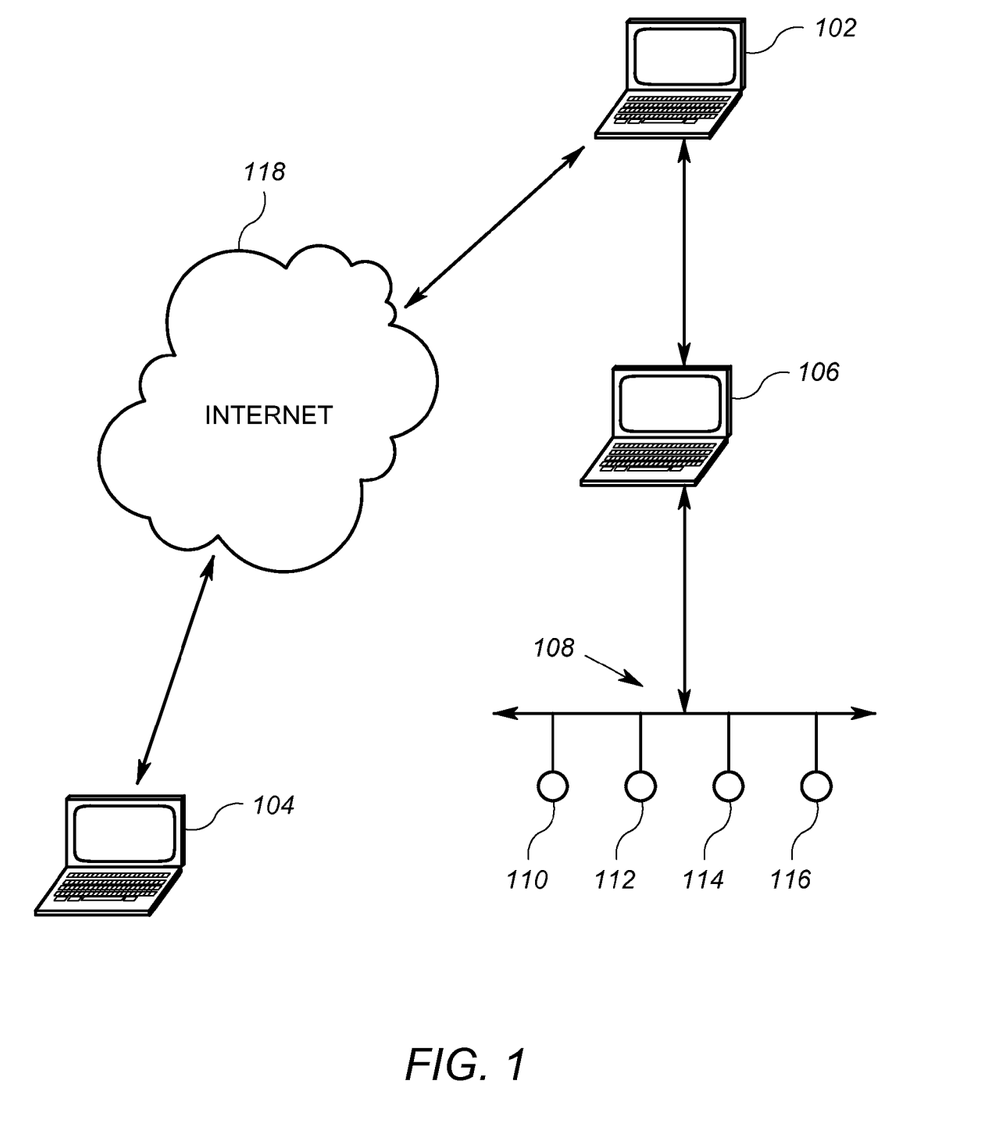
FIG. 1 shows a block diagram of an arrangement including two client computers and a server computer that implements an embodiment of the invention.

FIG. 1 shows a block diagram of an exemplary arrangement that implements an embodiment of the invention. The arrangement of FIG. 1 includes two client computers 102, 104 and a server 106. In this illustrative example, the server 106 may suitably be connected to a building control system that includes a building network 108 and a plurality of dispersed control devices 110, 112, 114 and 116. The client computer 102 is an intranet client connected to the server 106 via non-firewalled network connection such as a LAN, VPN or the like. The client computer 102 and the server 106 may suitably communicate using TCP communications. The client computer 104 is a web client connected to the server 106 via a firewalled Internet connection over the Internet 118. The client computer 104 and the server 106 use http for communications therebetween.

Figure 2:
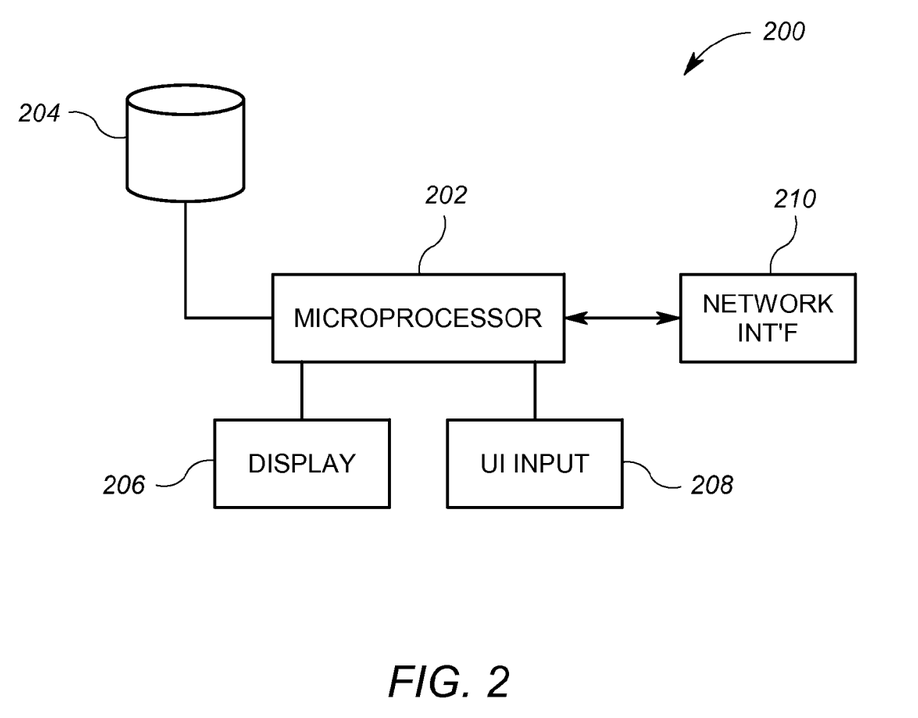
FIG. 2 shows a schematic diagram of an exemplary computing device that may be used as client and/or server computers in the embodiment of FIG. 1.

FIG. 2 shows a schematic diagram of the general architecture a computing device 200 that may suitably be used as the client computers 102, 104 and/or the server 106. The computing device 200 includes at least one microprocessor 202 that is operably connected to storage devices 204, a user interface display 206, user interface inputs 208, and one or more network interfaces 210. As is known in the art, the microprocessor 202 may be any suitable commercially available microprocessor that is employed in desk-top computers, laptop computers, server devices or the like. The storage devices 204 comprise both volatile and non-volatile memory, and may include one or more disk or tape drives. The user interface display 206 is any suitable visible display, such as a cathode ray tube monitor, an LCD monitor, or the like. Audible interfaces may also be used. The user interface inputs 208 may suitably include a keyboard, keypad, pointing device, or audio input device. The network interfaces 210 include any interface necessary to connect to one or more external networks as is known in the art.

Referring again to FIG. 1, the intranet client computer 102 is a computing device that may suitably have the architecture described above in connection with FIG. 2, and is programmed to, among other things, carry out the operations ascribed to the client computer 102 herein. In general, the client computer 102 is "full trust" client and may directly expose interfaces to the server 104 without firewall protection. Thus, the client computer 102 may operate in "full duplex" mode with respect to the server 104. For example, in a .NET environment, the server 104 may provide services and methods to application via the duplex communications.

The web client computer 104 is also a computing device that may suitably have the architecture described above in connection with FIG. 2. The web client computer 104, however, is programmed to carry out the operations ascribed to the client computer 104 herein, among other things. The web client computer 104 has web browser software that communicates with the server 106 via http requests and consequent replies. Thus the client computer 104 only operates in "reply/request" mode with respect to the server 106. The server 106 cannot provide unsolicited replies to the client computer 104.

The server 106 in this embodiment operates as, among other things a data server for information relating to the building control system. In particular, the server 106 is operably connected via the building network 108 to obtain data from, and provide control commands to, the control devices 110, 112, 114 and 116. The control devices 110, 112, 114 and 116 may suitably be circuits that control ventilation shaft dampers, steam valves, chilled water valves, air handling units, not shown, of a building heating, ventilation and air conditioning ("HVAC") system, not shown. An HVAC system of an office building or office building campus may have hundreds or thousands of controllers similar to the controllers 110, 112, 114 and 116 dispersed throughout the entire site.

The server 106 performs the operations of allowing centralized or localized user access to the data from all or most of the controllers, for example, the controllers 110, 112, 114 and 116. Such functions of the server are well-known in the art, and well-known examples include the INSIGHT™ workstation available from Siemens Building Technology, Inc. of Buffalo Grove, Ill. To provide these functions, the server 106 includes or is connected to devices that include communication drivers for all of the controllers 110, 112, 114 and 116.

The controllers 110, 112, 114 and 116 employ a number of values in their control operations, as is known in the art. For example, the room temperature controller (e.g. controller 110) receives and employs temperature measurements of a room or space, as well as set point information identifying the desired temperature. Some of the controllers 110, 112, 114 and 116 may obtain, from a connected sensor, measurements of air flow into a room or space. The controllers 110, 112, 114, 116 may also determine whether an alarm condition is present, such as due to an inability to adjust the temperature to a desired set point temperature. Such operations of controllers are well-known. Examples of commercially available controllers are the model Predator controller and the MEC controller available from Siemens Building Technologies, Inc.

In accordance with at least one embodiment of the present invention, the data and control operations available at the server 106 can be made available remotely to the client computers 102 and 104. In a preferred embodiment, the server makes these operations available by providing service processes, objects and/or methods that are accessible to clients using the .NET framework. Thus, for example, a user located at the client computer 102 may desire information regarding the controller 112. To this end, an application at the client computer 102 requests a service from the server 106 that obtains the desired information from the controller 112. The server 106 executes the service methods and/or processes and returns the desired information to the client computer 102.

As discussed above, one service often available at the server 106 is a change of value (COV) update that provides an update whenever a value, e.g. a temperature measurement, an alarm status, or a set point, has changed. Because the client computer 102 operates in full duplex communication mode with the server 106, the client computer 102 maintains an open interface to the server 106 when the client computer 102 subscribes to a COV update for a certain value. Thus, any time that value changes, the server 106 returns the value to the client computer 102.

In another example, a user at the client computer 104 may desire to obtain information regarding one or more the controllers 110, 112, 114 and 116 from the server 106. In the embodiment described herein, the web client computer 104 makes available many of the same applications as those available to the client computer 102. However, in contrast the client computer 102, the web client computer 104 cannot maintain open interfaces to objects at the server 106. Instead, to establish communications with the server computer 106, the web client computer 104 employs a web browser a webpage at the server 106 using a URL address. The server 106 then, pursuant to security and authentication procedures, causes the web client computer 104 to download the applications that perform the remote monitoring and control applications.

Figure 3:
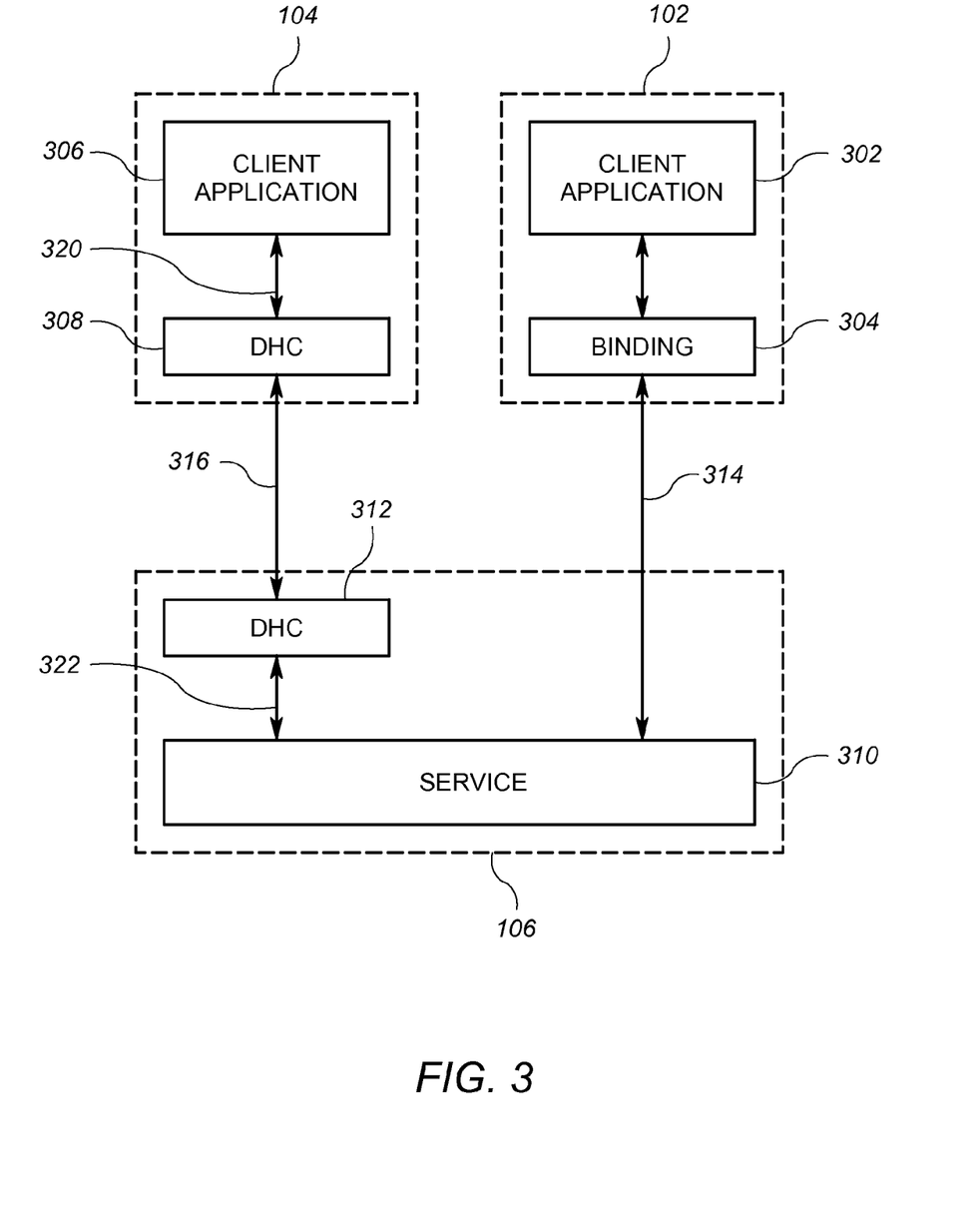
FIG. 3 shows a schematic diagram of the software elements employed in the arrangement of FIG. 1.

With the downloaded applications, the client computer 104 interacts with the server 106 to exchange data regarding the building control system that includes the controllers 110, 112, 114 and 116. The client computer 104 exchanges data with the server 106 using http requests and corresponding context replies. As discussed above, in http, a request is generated by a web client, and then held open until a reply is received. An http request can "time out" if a request is not received within a predetermined time. In an embodiment of the present invention, the client computer 104 further executes a first software interface that resides logically between the downloaded user application software and the Internet connection. The first software interface, which is discussed in further detail below in connection with FIG. 3, provides an interface that appears to be full duplex to the application at the web client computer 104. However, the first software interface interacts with the server 106 using normal http request/reply operations. As a result of the first software interface, the web client computer 104 may execute applications that are similar to or virtually identical to those implemented at full trust or full duplex clients such as the client computer 102. Moreover, embodiments of the invention implement the first software interface such that it more efficiently obtains updates as compared to prior art web clients that merely performed periodic polling.

FIG. 3 shows in further detail a functional diagram of the software executed by the client computers 102, 104 and the server 106 of FIG. 1. The client computer 102 includes a client application 302 and binding software 304. The web client computer 104 includes a client application 306 and duplex/http conversion software 308. The server 106 includes one or more service processes, methods or objects represented herein as an exemplary service 310, and server duplex/http conversion software 312.

The client application 302 is a software application that performs any suitable function, and which uses the service 310 in the ordinary course of operation. The client application 302 is preferably written in a language that is relatively machine-independent, and may be executed via a web browser or other firewalled connection. The client application 302 may suitably be a .NET-based, Java-based or ActiveX-based application or the like. By way of example, the client application 302 may include a graphic user interface to data in a building control system (See FIG. 1).

The service 310 may include a service that gathers data from the building control system and returns the data as requested by applications. The service 310 may suitably contain services, processes, methods and objects in a .NET or similar environment. Such services, processes, methods and/or objects in the service 310 are preferably ordinarily accessible by applications via a duplex communication channel.

The binding software 304 is software that binds the application 302 to the service 310 so that the functions and processes within the application 302 and the service 310 can exchange information. The binding software 304 operates over an Intranet connection 314 such that values and variables translate between the application 302 and the service 310. Suitable binding software would be known to those of ordinary skill in the art, and may suitably include software derived at least in part from the WCF framework, discussed further below.

The client application 306, like the software application 302 is a software application that performs any suitable function, and which uses the service 310 in the ordinary course of operation. Preferably, the client application 306 is essentially identical to the software application 302, such that the same code may be written for both full-trust machines such as the client computer 102 and web clients such as the web client 104. The client application 306 is preferably machine-independent and suitable for downloading and executing via a web-browser.

Thus, similar to the client application 302, the client application 306 may be a graphic user interface to data in a building control system (See FIG. 1), wherein the service 310 is a service that gathers data from the building control system and provides it as requested by applications.

In accordance with at least some embodiments of the invention, the client duplex/http conversion software ("client DHC") 308 is software exposes a full duplex interface 320 to the application 302, and facilitates http communications over the Internet 316 (or other open network) using http request/reply formatted communications. The full duplex interface 320 provided by the client DHC software 308 allows the web client computer 104 to execute the same application 306 as the application 302 of the full trust intranet or VPN client computer 102. Further detail regarding an exemplary embodiment of the client DHC 308 is provided below in connection with FIG. 4.

The client application 306 and the client DHC 308 are preferably downloadable software files that may be executed via a commercially available web browser within the client computer 104. Accordingly, nearly any suitable web-capable computer may be used as the web client computer 104. Structurally, the DHC 308 is preferably a service class that implements methods used by the client application 306. The client application 306 forms a host application domain, and the services of the DHC 308 are compiled into a library of the client application 306. The client application 306 forms the runtime environment in which the services of the DHC 308 are hosted.

In a preferred embodiment, the DHC 308 is a Windows Communication Foundation (WCF) implementation, which is based on WCF tools available from Microsoft Corporation of Redmond, Wash. The WCF is a unified framework for building secure, reliable and interoperable service-oriented application with managed code. WCF combines and extends the capabilities of the .NET framework and delivers a unified development experience across multiple platforms, protocols and topologies, including firewalled and non-firewalled topologies.

The service 310, as discussed above, is a collection of objects and/or other software that provide data services, among other things, to applications. In the exemplary embodiment described herein, the service 310 may includes a service that subscribes to updates of different variables within a building control system, such as updates to temperature measurements, set point values, alarm status values, etc. Other services may provide the ability to communicate a command or set point to a controller within the building control system, such as the controllers 110, 112, 114 and 116 of FIG. 1.

The server side duplex/http conversion software ("server DHC") 312 is software that converts between duplex communications provided by the service 310 to http communications that may be used to communicate with the web client computer 104. In particular, the server DHC 312 is configured to cooperate with the client DHC 308 to provide what operates effectively as duplex communications between the application 306 and the service 310. The server DHC 312 thus provides an http request/reply interface to the Internet 316, and a duplex interface 322 to the service 310. Further detail regarding the server DHC 312 is provided below in connection with FIG. 4. The DHC 312 may also suitably be configured in the WCF framework.

An exemplary operation of the elements of FIG. 3 is described herebelow. Consider an example in which both the client computers 102 and 104 run an application that allows a user to have some control and monitoring capability over the controllers 110, 112, 114 and 116 of FIG. 1.

In the client computer 102, the user logs onto the application 302. The application 302 provides the user with options for displaying and monitoring values from the controllers 110, 112, 114 and 116. If the user provides input causing the application 302 to request temperature values related to the controller 112, then the application 302 provides a request for a service method or other function or object to obtain that value to the service 310 via the binding software 304. In a preferred embodiment, the service 310 executes the method and/or instantiates an object that obtains the data requested from the controller 112. This method or object provides the returned value to the application 302 via the binding 304. The method and/or object at the service 310 may then terminate as there is nothing left for it to do. Such techniques of provides client/service operations in a full trust duplex network 314 are known in the art.

The application 302 may also allow the user to subscribe to, for example, changes in alarm status for controllers 114 and 116. In such a case, the application 302 provides a request for a service that obtains ongoing updates to alarm status values to the service 310 via the binding software 304. In a preferred embodiment, the service 310 executes a process or other function and/or instantiates an object (or pair of objects) that receives all changes to alarm status in controllers 114 and 116. This function and/or object provides any updates to the application 302 via the binding 304. The function and/or instantiated object at the service 310 remains active until it is terminated by a further user command. Using full duplex communications 314 and the binding 304, the function and/or instantiated object at the service 310 provides continuous updates to the application 302 as alarm status changes occur.

Further to the above example, the web client 104 provides the same, or nearly the same, capabilities as the client computer 102 via the application 306. In the client computer 104, the user first accesses the server computer 106 and the service 310 using by transmitting a URL via the Internet 310 that corresponds to the server 106. The server 106 also contains a web server that causes the application 306 and client DHC 308 to be downloaded to the client computer 104. It is noted that password and/or other authorization measures may be implemented before the server 106 provides the application 306 and client DHC 308 to the client computer 104.

Thus, the web client computer 104 may receive and install the software necessary to utilize the features of the application 306 using a web browser. By contrast, the application 302 may be physically installed onto the computer 102 via disk or download over the Intranet 314 in a full-trust environment. Because the application 302 does not have the limitations of the web-downloadable version, the application 302 may include additional features and functionality, even though portions are identical to the web client application 302.

The web browser at the client computer 104 causes the application 306 and DHC client 308 to be executed at the client computer 104. The application 306 is preferably identical, at least in part, to the application 302. Accordingly, the application 306 similarly provides the user with options for displaying and monitoring values from the controllers 110, 112, 114 and 116.

If the user provides input causing the application 306 to obtain temperature values from the controller 112, then the application 306 provides a request for a service object to obtain that value to the client DHC 308, and leaves the full-duplex interface 320 open to receive the result. The client DHC 308, however, translates or converts the service request to an http request, for example a "GET" request, to invoke the service method(s) and/or object that retrieve that value. To this end, implementations of the client in DHC 308 may employ the service contract and data contract functionalities of WCF, which are known in the art.

The client DHC 308 provides the http request to the server DHC 312. Upon receiving the http request, the server DHC 312 generates a corresponding service request, which is based on the content of the http request. The server DHC 312 provides the service request to the service 310 to obtain the requested value. In a preferred embodiment, the service 310 executes the function and/or instantiates an object that obtains the data requested from the controller 112. This function and/or object provides the returned value to the server DHC 312 which formulates a http reply. The server DHC 312 provides the http reply to the client DHC 308 via the Internet 316. The client DHC 308 receives the reply and provides it to the application 306 via the duplex interface 320.

Similar to the application 302, the application 306 may also allow the user to subscribe to changes in alarm status for controllers 114 and 116. In such a case, the application 302 provides a request for a service that obtains ongoing updates to alarm status values to the client DHC 308. The client DHC 308 then transmits an http request containing a request for the service to the server DHC 312. The DHC 312 may provide the reply to the http request simply acknowledging receipt of the request, or providing other information via the reply. In any event, the reply "close" the http request.

In addition, the server DHC 312 provides a request to the service 310 to instantiate one or more objects and/or execute functions (i.e. methods) that receive all changes to alarm status in controllers 114 and 116. This functions/objects provide any updates to the server DHC 312. The functions and/or objects at the service 310 remain active until terminated by a further command from the DHC 312. However, absent an http request, the server DHC 312 does not transmit any updates received from the service 310 to the client DHC 310.

Accordingly, from time to time, the client DHC 308 issues additional http requests. The additional http requests may be in the form of empty polling requests. Alternatively, the additional http requests may be requests associated with another service request from the application 306. Any updates to the alarm status of the controllers 114, 116 from the service functions and/or objects may be included with the reply to the additional http requests received from the client DHC 308.

After receiving any such replies containing alarm status updates, the client DHC 308 provides the updates to the alarm status to the application 302, and in particular, to the operation that requested it, via the duplex interface 320.

Thus, the client DHC 308 and server DHC 312 cooperate to provide what otherwise amounts to a duplex communication channel between the application 306 and the service 310. As a consequence, the same application, or at least portions thereof, may be used for both web clients that are otherwise incapable of duplex communications, as well as clients that can be configured for direct duplex communications over a LAN, VPN or other intranetwork.

Figure 4:
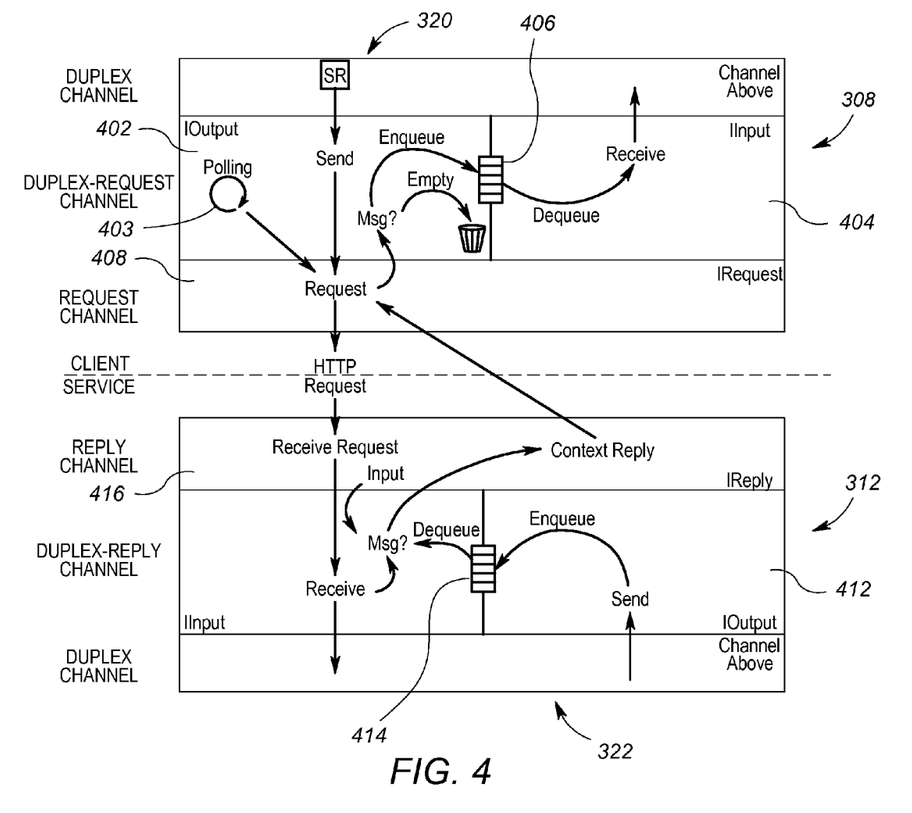
FIG. 4 shows a representative flow diagram showing in further detail the operation of select software elements of FIG. 2.

FIG. 4 shows in further detail exemplary embodiments of the client DHC 308 and the server DHC 312. The client DHC 308 and the server DHC 312 communicate with each other based on a normal http request/reply protocol. However, as discussed above in connection with FIG. 3, the client DHC 308 provides a duplex interface 320 to the client application 306. Similarly, the DHC 312 provides a duplex interface 322 to the service 310.

As shown in FIG. 4, an embodiment of the client DHC 308 includes an IOutput function 402, an IInput function 404, a client queue 406, and a request channel 408. A function may be a method or series of methods in a .NET environment. The server 312 includes an IInput function 410, an IOutput function 412, a server queue 414, and a reply channel 416.

In normal operation, the IOutput channel 402 receives a service request SR from the duplex channel interface 320 of the client application 306. The IOutput channel 402 passes the service request SR to the request channel 408, and stores an indication that a reply is expected to this service request SR from the server application. The request channel 408 formulates an http request that includes a message representative of the service request SR. The request channel provides the http request to the reply channel 416 of the server DHC 312.

The reply channel 416 provides receives the http request that includes the SR message and provides the SR message to the IInput function 410. The IInput function 410 performs two operations. First, the IInput function 410 causes one or more messages in the queue 414 to be packaged in a reply message, which is sent to the reply channel 416. The queue 414 is preferably a first-in-first-out queue that stores messages generated by service functions instantiated by prior service requests from the application 306 or notification from the server 310 to the application 306. The messages in the queue 414 may or may not, and typically do not, relate to the just-received SR message.

The reply channel 416 thus generates the reply message (containing the dequeued messages) to the http request and transmits the reply message to the request channel 408 to close out the http request. The request channel 408 causes the messages in the context reply to be placed in the queue 406 at the client DHC 308.

Referring again to the IInput function 410 of the DHC 312, the IInput function 410 also provides the service request SR that was included with the http request to the service 310 via a duplex channel 422. As discussed above in connection with FIG. 3, the service 310 may suitably instantiate an object and or execute a method in response to the service request SR. The service 310 provides one or more return values (either in one instance or an ongoing manner) to the IOutput function 412 as the return values are generated. An example of ongoing return values would be as a result of the application subscribing to a point value, such as a building sensor value, alarm condition value or the like. Such ongoing values are sometimes referred to as callback values, or server generated values. Such values differ from normal "return values" is that they are not returned as a result of a unique instance of a method call.

The IOutput function 412 places the return values in the service queue 414. The return values in the service queue 414 will at some subsequent point be placed in a reply message to a later http request. Thus, the replies of the service 310 to the service requests SR of the application 306 are not necessarily provided in the context reply of the reply channel 416 to the http request of the request channel 408. In many or most cases, the actual return values to the service requests SR are provided the reply message to an unrelated http request.

Referring again to the client DHC 308, the IOutput function 404 of the client DHC 308 dequeues messages from the client queue 406 and provides them to the application 306 via the full duplex interface 320. Because the messages contain an indication of the original service request SR to which they pertain, the IOutput function 404 causes messages of the queue to be returned to the appropriate service request of the application 306.

Thus, the client DHC 308 and the service DHC 312 provide or at least emulate two-way communications between the application 302 and the service 310 by disassociating http requests from their context replies. The client DHC 308 furthermore causes periodic polling (empty) requests to be generated by the IOutput function channel 402 to ensure that replies to open service requests are received, or that notification from the server 310 to the application 306 are received. In this manner, open service requests can be satisfied as soon as responses become available.

FIGS. 5-8 show the basic operations of the various elements of the client DHC 308 and the service DHC 312 in accordance with an embodiment of the invention. It will be appreciated that the flow diagram of FIGS. 5-8 show the functional operations, which may be implemented in software and the accompanying computer hardware (see FIG. 2) a number of ways by those of ordinary skill in the art.

Figure 5A:
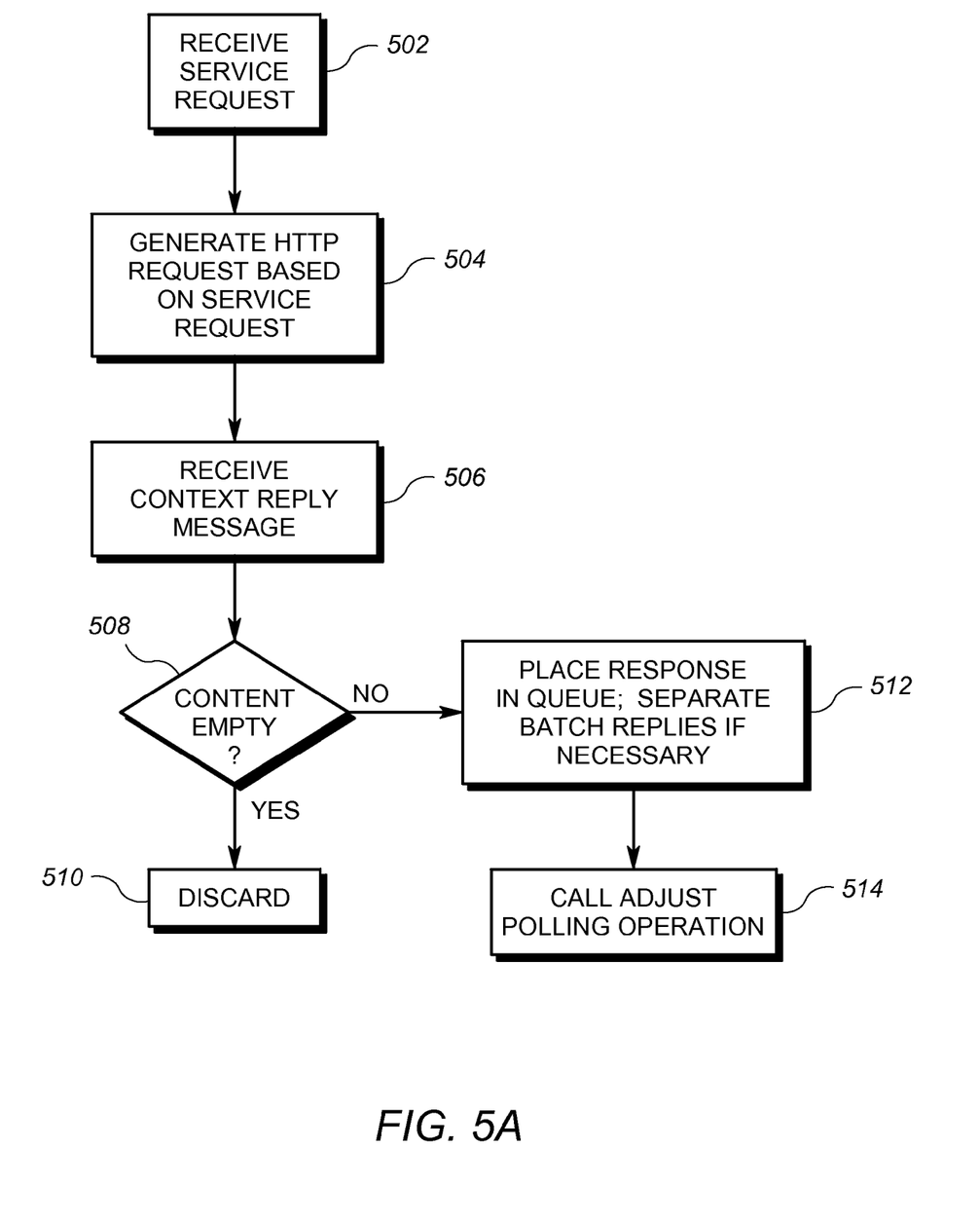
FIGS. 5a and 5b show flow diagrams of exemplary message generation and polling operations of one of the processes of the client duplex to http conversion software of FIG. 4.
Figure 5B:
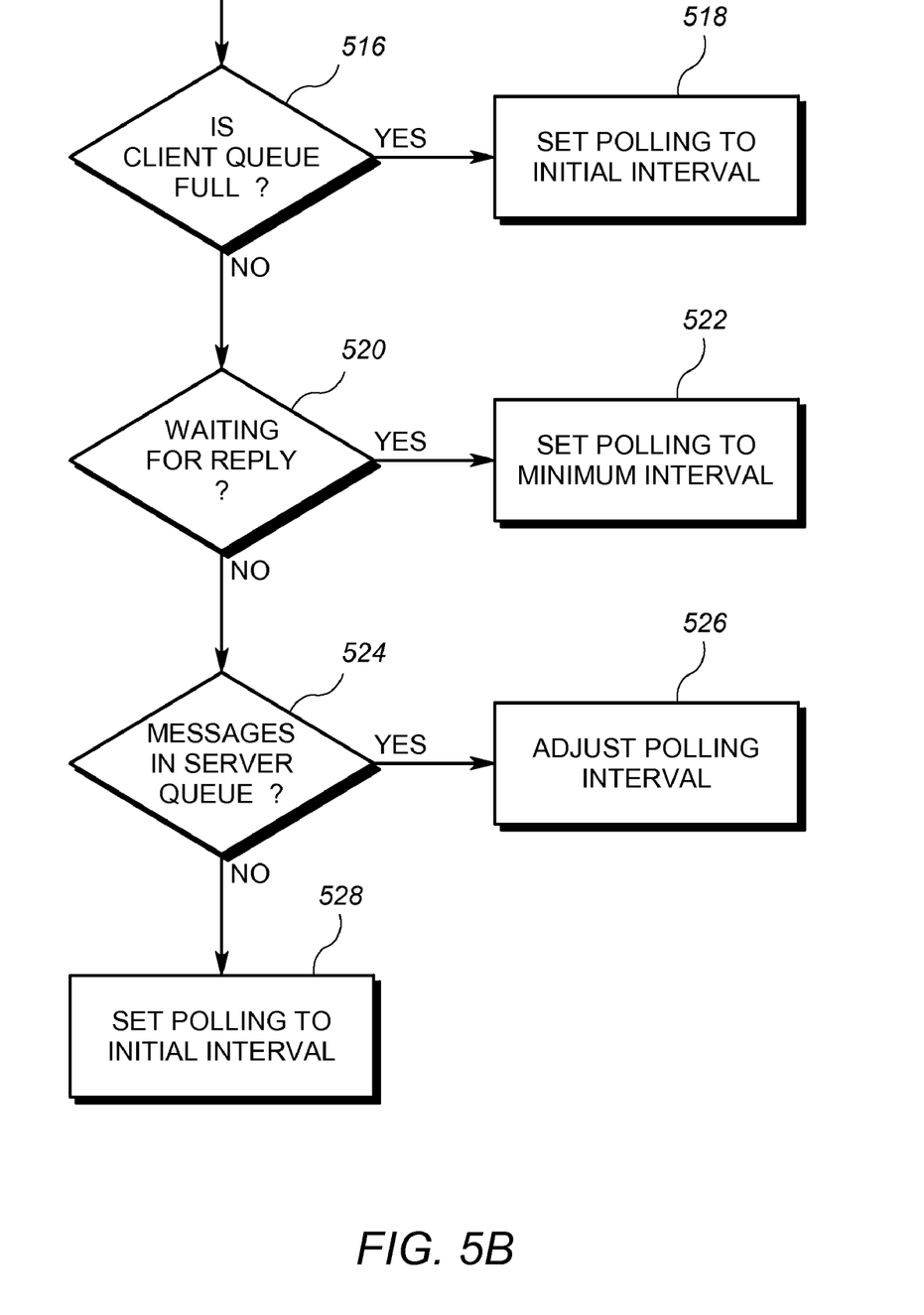

FIG. 5a shows the operation of the IOutput function 402 of the client DHC 308. The IOutput function 402 operates to receive method calls from the application 306 via the duplex channel, receive return values or server-initiated values from the service DHC 312 via the request channel 408. FIG. 5b shows the operation of the IOutput function 402 to control a polling operation. The threads of the IOutput function shown in FIGS. 5a and 5b preferably operate as individual threads, but are considered as part of the IOutput function 402.

Referring to FIG. 5a, the IOutput function 402 operates to generate service requests based on method calls received from the application 306 to the service 310. To this end, in step 502, the IOutput function 402 receives a method call containing or defining a service request SR from the duplex channel 320. In step 504, the IOutput function 402 provides the service request SR to the request channel 408 where it is packaged in an http request and transferred. The request channel 408 always expects a response to a transferred http request. Such a response is received in step 506. However, in accordance with this embodiment of the invention, the responsive message does not necessary (and in some cases never) corresponds to the specific service request SR transferred in step 504.

In particular, in step 506, the IOutput function 402 receives a context reply message from the request channel 408. The context reply message can contain a single return value associated with a prior service request from the application 306, or can contain multiple values in a batch message. As discussed above, the content of the context reply is typically not related to the content of the service request sent in step 504. In addition, the content of the context reply may contain information generated by the service that is not specifically responsive to any particular request. The content of the context reply may also be empty.

Accordingly, in step 508, the IOutput function 402 determines whether the content of the received reply message is empty, or at least contains no information responsive to the application 306. If so, then in step 510, the IOutput function 402 discards the reply message and returns to step 502. In such a case, the empty message has been provided only to complete the http request/reply transaction.

If, however, the reply message contains returned values responsive to one or more service requests from the application 306 (or other values), then the IOutput function 402 in step 512 places the response or responses in the client queue 406. If the reply message is a batch message that contains multiple bundled return (or other) values, then the IOutput function 402 separates the bundled replies and places them in the client queue 406. In this manner, each message or reply in the client queue 406 is a separate value for the application 306.

After step 512, the IOutput function 402 performs step 514. In step 514, the IOutput function 402 performs a function that updates the polling operation. As discussed above, it is advantageous to periodically generate http requests even if a "service request" from the application 306 has not been received. Such an http request is called a "polling" request. In the embodiment described herein, a separate polling thread (see thread 403 of FIG. 4) is executed within the IOutput function illustrated in FIG. 5*b*, discussed below.

Regarding step 514, the context reply message in this embodiment also contains information regarding the fullness of the server queue 414 in the server DHC 312 (see FIG. 4). The information may simply identify whether any messages remain in the queue 414, or may alternatively identify a quantitative measure of the fullness/length of the queue 414 (i.e. number of messages or quantity of data). In step 514, the IOutput function 402 executes a thread or operation that extracts and uses this information from the received message.

FIG. 5*b* shows the operations of the IOtput function 402 to update the polling operation. In the embodiment described herein, the polling operation basically generates a polling message after a determined "polling interval" or time period. This is represented in FIG. 4 as element 403. After each polling interval, the polling thread 403 causes the request channel 408 to generate an http request without a "service request" received from the application. The http request causes the DHC 312 to generate a context reply, which can contain one or more messages that are stored in the server queue 414, as will be discussed further below in connection with FIG. 7.

The operations of FIG. 5*b* update the polling interval based on a number of factors, including the received information regarding the fullness of the server queue 414. In step 516, the IOutput function 402 determines whether the client queue 406 is full. If so, then the IOutput function 402 in step 518 sets the polling interval to a relatively long interval. In this embodiment the default or initial interval is essentially the maximum interval. It will be appreciated that if the current polling interval is the initial interval, the polling interval is not changed. Step 518 ensures that the polling interval is relatively long if there is no room in the client queue 406.

If, however, in step 516, it is determined that the client queue 406 is not full, then the IOutput function 402 executes step 520. In step 520, the IOutput function 402 determines whether there are any open service requests for which a reply is expected. In particular, because the present invention decouples the service requests and responses at the application level from the http request/replies at the request channel level, there will often be open service requests for which a reply has not been received. If there are open service requests, then the IOutput function 402 proceeds to step 522. If there are no open service requests, then the IOutput function 402 proceeds to step 524. In step 522, the IOutput function sets the polling interval to the minimum interval. Thus, if the client queue 406 is not full, and there is an "open" service request, i.e. a service request expecting a direct response, then the polling interval is minimized to accelerate the response time.

In step 524, the IOutput function 402 determines whether there is a message in the server queue 414. Thus, after the IOutput queue 402 determines that the client queue 406 is not full, and that the there are no open service requests, the IOutput function 402 determines whether the server queue 414 has additional messages that need to be retrieved. As discussed further above, it is preferable that non-empty context replies received in step 506 of FIG. 5*a* include information as to the fullness of the server queue 414. The information may simply indicate that the server queue 414 is non-empty, or may actually provide a message count or the like. In step 524, the IOutput function 402 examines this information from the most recent non-empty context reply, and determines whether there is at least one message in the server queue 402. If the IOutput function 402 determines that the server queue is non-empty, then the IOutput function 402 executes step 526. If not, then the IOutput function 402 executes step 528.

In step 526, the IOutput function 402 adjusts the polling interval based on the queue fullness information. In general, the polling interval is inversely proportional to the measure of fullness of the server queue 414. It will be noted that in some cases, the polling interval will actually be increased in step 526. In particular, if the polling interval is very small, and the queue fullness information indicates that only a small number of messages are in the server queue 414, then the IOutput function 402 may actually increase the polling interval to a level that is appropriate for the fullness level.

Referring to step 528, the IOutput function 402 reaches step 528 if there are no outstanding service requests (step 520) and no messages in the server queue (step 524). In step 528, the IOutput function 402 sets the polling interval to the maximum or initial interval. The purpose of step 528 is to reduce network traffic by reducing polling requests when circumstances suggest that polling may be less frequent.

Figure 5C:
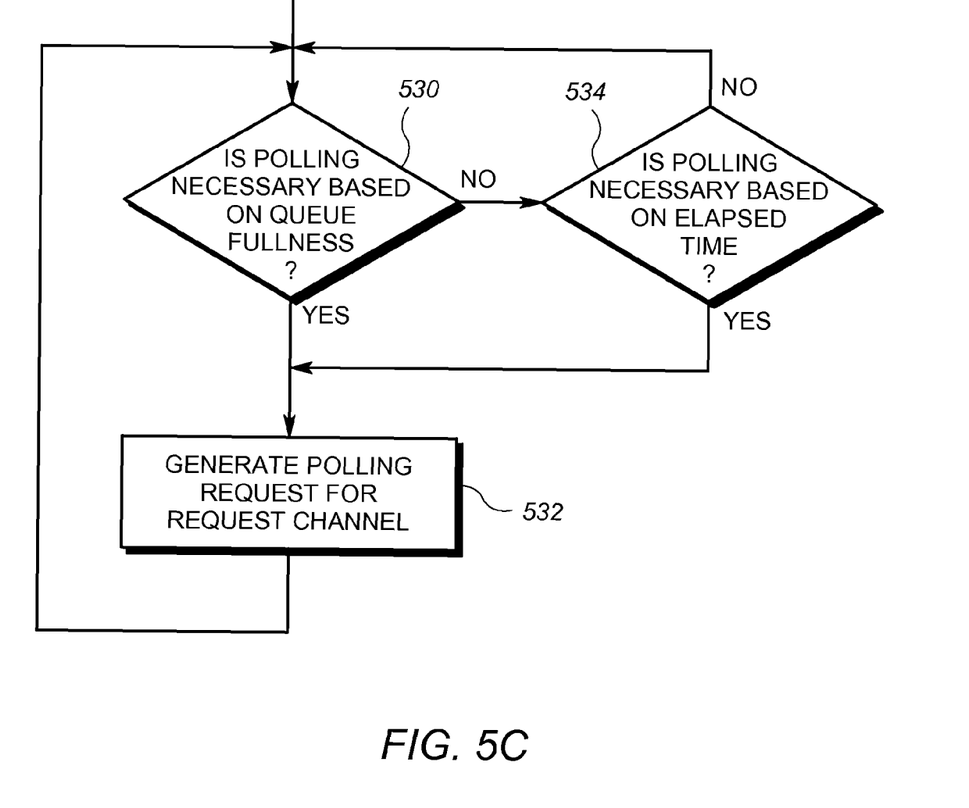
FIG. 5c shows a flow diagram of an alternative polling operation.

FIG. 5*c* shows an alternative set of operations that may be used to carry out the polling thread. The operations of FIG. 5*c* assume a static polling interval. However, the IOutput function 402 may override the polling interval and generate an extra polling message if the IOutput function 402 determines that the server queue 414 is at a sufficient fullness level.

Referring to step 530, the IOutput function 402 determines whether a polling message is required based on the fullness level of the server queue 414. Again, the server queue fullness level is extracted from context reply messages. If the server queue fullness level indicates that a polling message is necessary, then the IOutput function 402 proceeds to step 532. Otherwise, the IOutput function 402 proceeds to step 534. In step 532, the IOutput function 402 causes a polling request to be generated and passed to the request channel 408. After step 532, the IOutput function 402 returns to step 530.

In step 534, the IOutput function 402 determines whether polling is necessary based on the polling interval. If a sufficient time period has passed in which there has not been any context reply, then the IOutput function 402 may not have current information regarding the fullness of the driver queue 414. Accordingly, if a predetermined time period has passed since the last context reply, then the IOutput function 402 proceeds to step 532. Otherwise, the IOutput function 402 returns to step 530.

Figure 6:
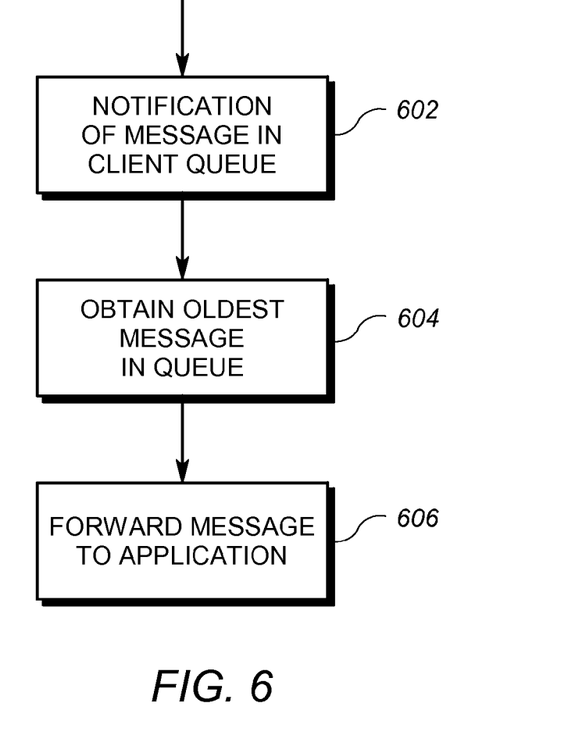
FIG. 6 shows a flow diagram of exemplary operation of another of the processes of the client duplex to http conversion software of FIG. 4.

FIG. 6 shows the operations of the IInput function 404 of FIG. 4. The IInput function 404 handles delivery of received server values stored in the client queue 406 to the application 306.

The operations of FIG. 6 are initiated whenever the IInput function 404 identifies that the client queue 406 includes at least one return value, server-generated value, file or message for the application 306 (Step 602). After step 602, the IInput function 404 proceeds to step 604. In step 604, the IInput function 404 obtains the oldest return message in the client queue 406 and determines what variable/process within the application 306 is intended to receive the return message. The message may suitably contain information regarding the variable/process within the application 306 to which it pertains. Other methods of matching values to application method calls may be employed. In step 606, the IInput function 404 makes the return value or server-value available to the application 306 via the full duplex interface 320.

Figure 7:
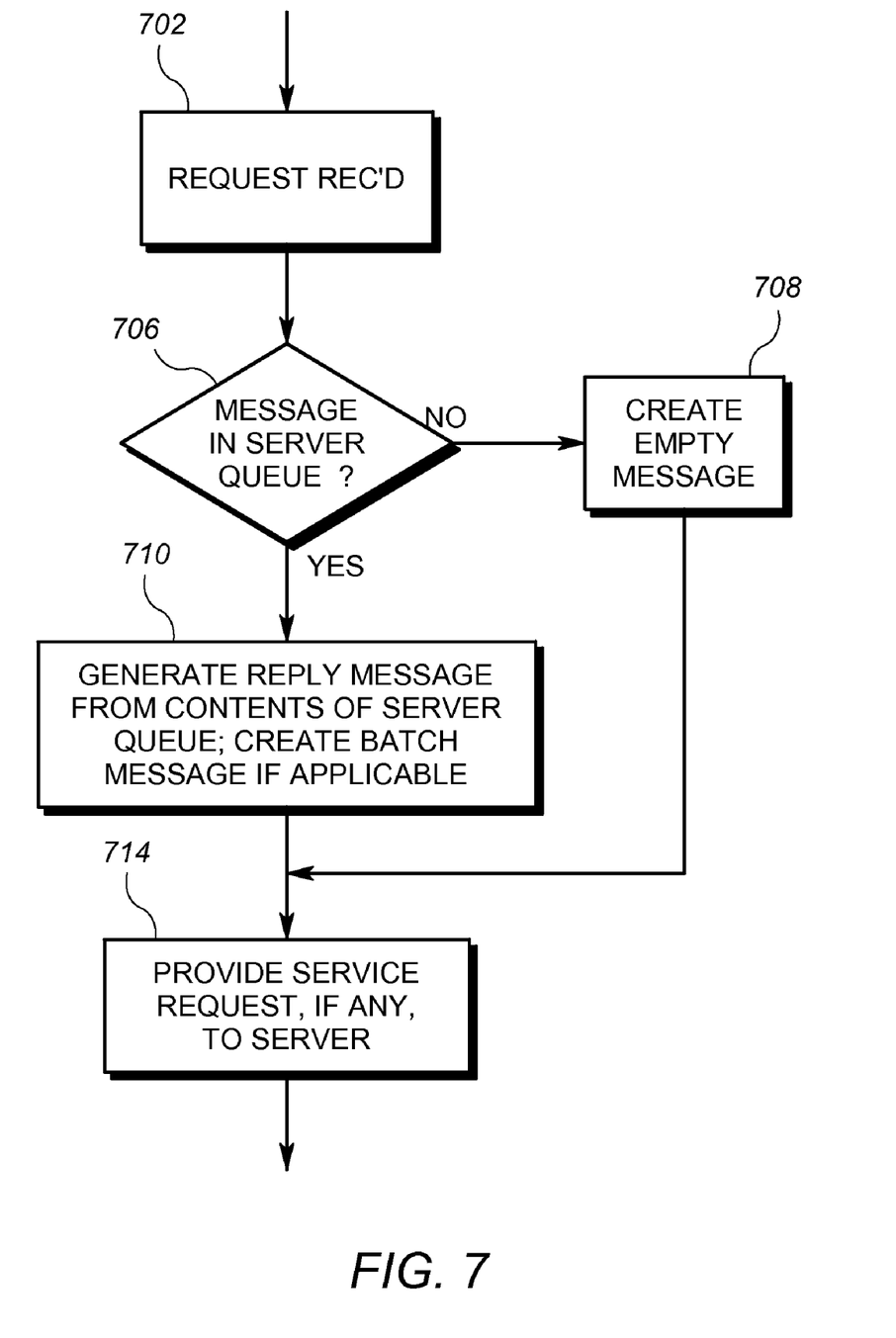
FIG. 7 shows a flow diagram of exemplary operation of one of the processes of the server duplex to http conversion software of FIG. 4.

FIG. 7 shows the operations of the IInput function 410 of the server DHC 312. In general, the IInput function 410 handles incoming request messages from the reply channel 416 (ultimately from the client DHC 308) and also handles the generation of reply messages for the reply channel 416.

The operations of FIG. 7 are initiated whenever the IInput function 410 receives a request message from the reply channel 416 (step 702). The request message is the http request generated by the request channel 408 which may include a service request (or may be empty). In step 706, the IInput function 410 determines whether there is at least one message in the server queue 414 that needs to be transmitted to the client application 306. If not, then the IInput function 410 executes step 708. If there is a message in the server queue 414, however, then the IInput function executes step 710.

In step 708, the IInput function 410 creates an empty message for a context reply and provides it to the reply channel 416. The empty message may include an indication that the server queue 414 is empty so that the client-side IOutput function 402 can determine that polling is not necessary. However, the mere fact that the context reply message is empty may constitute the indication to the IOutput function 402 that the server queue 414 is empty. In any event, after step 708, the IInput function 410 of the server DHC 312 proceeds to step 714, discussed further below.

In step 710, the IInput function 410 obtains at least one value or file in the queue 414 and provides it to the reply channel 416 to be included as the context reply message. As discussed further above in connection with FIG. 4, and as will be discussed below in connection with FIG. 8, the server queue 414 includes values from the service 310 that are to be delivered to the application 306. Such values may be return values generated in response to a direct request from the application, or may be server-initiated values, for example, alarm values or values to which the application 306 has an ongoing subscription. Accordingly, in step 710, the IInput function 410 obtains one or more of the values in the queue 414 and generates a context reply message, which is provided to the reply channel 416 for transmission to the client DHC 308.

In particular, in the embodiment described herein, the IInput function 410 first attempts to formulate a batch message with multiple values or files in the server queue 414. Such a batch message would include return values or other values relevant to a number of prior service requests. It will be appreciated that in most cases, the message provided to the reply channel 416 for the context reply will likely not include a response to the http request (and its service request SR) received in step 702, but rather a response relevant to one or more prior service requests, and/or other server-initiated values. The IInput function 410 may also obtain a measure of the fullness of the queue 414 and cause that to be included in the context reply message. The measure of fullness is used in by the IOutput function 402 of the DHC 308 in step 514, discussed above. The resulting batch message is provided to the reply channel 416.

After step 710, the IInput function 410 proceeds to step 714. In step 714, the IInput function 410 handles the contents of the request message received in step 702. If the request message is an empty message, such as a polling message, the IInput function 410 discards the message. If the request message includes a service request for the service 310, the IInput function 410 provides the service request to the service 310 via the duplex channel 322.

Figure 8:
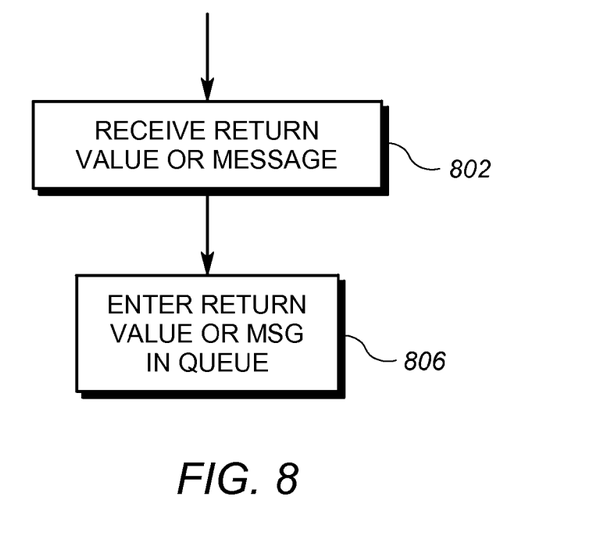
FIG. 8 shows a flow diagram of exemplary operation of another of the processes of the server duplex to http conversion software of FIG. 4.

FIG. 8 shows the operations of the IOutput function 412 of the server DHC 312. In general, the IOutput function 412 receives return values and/or server-generated (callback) values from the service 310, and places them in the server queue 414.

Particularly, in step 802, the IOutput function 412 receives a return value or a server-initiated value from the service 310 via the duplex interface 322. The IOutput function 412 then executes step 806. In step 806, the IOutput function 412 enters the value or values as the latest entry in the queue 414.

It will be appreciated that the above describe operations may be carried out a number of ways. Moreover, at least some advantages may be obtained in embodiments that do not include the message batching in the driver queue 414. Likewise, at least some advantages may be realized in embodiments that do not include dynamic polling.

In general, the above-described configuration allows for application designs that are interchangeable between thick clients and thin clients. In particular, the applications (i.e. application 306) can be designed for full duplex communication, as would be available in a thick client. The same application can be used on a thin client, such as a web client, that typically employs http reply/request communications, by employing the DHC 308 on the client side and the DHC 312 on the service side. Similarly, the same underlying server design can be used for both thick and thin clients.

Indeed, it will be appreciated that the above described embodiments are merely exemplary, and that those of ordinary skill in the art may devise their own modifications and implementations that incorporate the principles of the invention and fall within the spirit and scope thereof.

Additional detail of exemplary embodiments is provided in U.S. Provisional Patent application Ser. No. 61/019,697, filed Jan. 8, 2008, which is incorporated herein by reference.

We claim:

1. A method, comprising:
   a1) providing at a first computer at least one application generating service requests at a duplex channel interface, at least a first service request requesting multiple subsequent data responses from a service located on a second computer;

a2) providing from the at least one application to a first process the first service request and a second service request;

b) employing the first process to convert the first service request into a first http request;

c) transmitting the first http request over a network;

d) receiving a context reply to the first http request;

e) employing the first process to generate a second http request corresponding to the second service request;

f) receiving a context reply to the second http request, the context reply containing data responsive to the first service request;

g) providing the data response to the first service request to the duplex channel interface.

2. The method of claim 1, wherein step d) comprises receiving the context reply to the first http request, the context reply containing no data related to the first service request.

3. The method of claim 1, wherein the first service request includes a subscription for updates to a value in a building control system.

4. The method of claim 1, wherein step e) further comprises employing the first process to generate a further request in the form of a polling request.

5. The method of claim 1, wherein step e) further comprises employing the first process to generate the second http request containing information relating to the second service request.

6. The method of claim 1, wherein step d) comprises receiving the context reply to the first http request, the context reply containing an empty message.

7. The method of claim 1, wherein step d) comprises receiving the context reply to the first http request, the context reply containing a batch message including data for a plurality of service requests.

8. The method of claim 1, wherein step e) further comprises employing the first process to generate the second http request after a period of time from the first http request, and wherein the period of time is dependent on a fullness of a message queue at the second computer.

9. The method of claim 1, wherein step e) further comprises employing the first process to generate the second http request in the form of a polling request.

10. A method, comprising:
a) providing at a first computer one or more applications generating service requests at a duplex channel interface, at least a first service request requesting multiple subsequent data responses from a service located on a second computer;

b) employing a first process to convert the first service request into a first http request;

c) transmitting the first http request over a network;

d) receiving a context reply to the first http request, the context reply comprising a batch message containing data responsive to a plurality of service requests.

11. The method of claim 10 wherein the first service request includes a subscription for updates to a value in a building control system.

12. The method of claim 11, further comprising:
e) employing the first process to generate a second http request f) transmitting the second http request over a network;

g) receiving a context reply to the second http request, the context reply including a first update to the value in the building control system.

13. The method of claim 12, wherein the context reply to the second http request is a batch message containing the first update value and data for at least one other application.

14. A method, comprising:
a) providing at a first computer an application generating service requests at a duplex channel interface, at least a first service request requesting multiple subsequent data responses from a service located on a second computer;

b) employing a first process to convert the first service request into a first http request;

c) transmitting the first http request over a network;

d) employing the first process to generate a second http request in the form of a polling request;

e) receiving a context reply to the second http request containing data responsive to the first service request;

f) providing the data response to the first service request to the duplex channel interface.

15. The method of claim 14, further comprising, prior to step e) receiving a context reply to the first http request containing data responsive to a service request other than the first service request.

16. The method of claim 15, wherein step d) further comprises employing the first process to generate a second http request in the form of a polling request responsive to fullness information indicating a fullness of a queue in another device.

17. The method of claim 16, further comprising receiving a context reply message that includes the fullness information.

18. The method of claim 14, wherein step d) further comprises employing the first process to generate a second http request in the form of a polling request responsive to predetermined duration of time passing since generating a most recent http request.

19. A server configuration comprising:
a server having a duplex interface configured to communicate with a first client using duplex communications, the server further configured to receive a first service request from the first client without an http request/reply formatted message; and
a duplex converter configured to receive a first http request/reply formatted message from a second client, and to convert the first http request/reply formatted message into the first service request, the duplex convert further configured to communicate the first service request with the server using the duplex interface.

20. The server configuration of claim 19, further comprising a microprocessor and a display.

21. The server configuration of claim 19, wherein the duplex converter further comprises a queue configured to receive a plurality of values from the server via the duplex interface.

22. The server configuration of claim 21, wherein the duplex converter is further configured to generate a batch message comprising at least two values received from the server via the duplex interface, the duplex converter configured provide the batch message as a reply to a received http request.

23. A client configuration comprising:
a client application having a duplex interface configured to allow the client application to access the server process without an http request/reply formatted message; and
a duplex converter configured to communicate using an http request/reply format to communicate with a server, and the duplex converter further configured to communicate with the client application using the duplex interface.

24. The client configuration of claim 23, further comprising a microprocessor and a display.

25. The client configuration of claim 23, wherein the duplex converter further comprises a queue configured to store a plurality of values from the server via the duplex converter.

26. A client configuration comprising:
- a client application having a duplex interface for accessing a server process; and
- a duplex converter configured to communicate using an http request/reply communication format to communicate with a server, and configured to communicate with the client application using the duplex interface, wherein the duplex converter is further configured to generate a polling message and provide the polling message in an http request.

27. The client configuration of claim 26, wherein the duplex converter is further configured to generate the polling message repeatedly after a polling interval.

28. The client configuration of claim 27, wherein the duplex converter is further configured to adjust the polling interval based on a server queue fullness value.

* * * * *